United States Patent
Hinderliter et al.

(10) Patent No.: US 11,859,610 B2
(45) Date of Patent: Jan. 2, 2024

(54) SEGMENTED FLUID END PLUNGER PUMP

(71) Applicant: U.S. Well Services, LLC, Houston, TX (US)

(72) Inventors: Brandon Hinderliter, Houston, TX (US); Lon Robinson, Houston, TX (US); Jared Oehring, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 1 day.

(21) Appl. No.: 18/100,783

(22) Filed: Jan. 24, 2023

(65) Prior Publication Data

US 2023/0258173 A1 Aug. 17, 2023

Related U.S. Application Data

(63) Continuation of application No. 17/136,943, filed on Dec. 29, 2020, now Pat. No. 11,560,887.

(60) Provisional application No. 62/955,806, filed on Dec. 31, 2019.

(51) Int. Cl.
  *F04B 53/16* (2006.01)
  *F04B 53/22* (2006.01)
  *F16J 10/02* (2006.01)

(52) U.S. Cl.
  CPC ............. *F04B 53/16* (2013.01); *F04B 53/22* (2013.01); *F16J 10/02* (2013.01)

(58) Field of Classification Search
  CPC ................................ F04B 53/16; F04B 53/22
  See application file for complete search history.

(56) References Cited

U.S. PATENT DOCUMENTS

| | | | |
|---|---|---|---|
| 8,601,687 B2 * | 12/2013 | Ochoa | F04B 53/14 248/639 |
| 9,188,123 B2 * | 11/2015 | Hubenschmidt | F04B 53/007 |
| 9,243,630 B2 * | 1/2016 | Foote | F04B 53/14 |
| 9,528,508 B2 * | 12/2016 | Thomeer | F04B 53/147 |
| 10,184,470 B2 * | 1/2019 | Barnett, Jr. | F04B 53/007 |
| 10,563,494 B2 * | 2/2020 | Graham | B23P 6/04 |
| 10,760,567 B2 * | 9/2020 | Salih | F04B 47/02 |
| 11,293,432 B2 * | 4/2022 | Cordes | F04B 1/0452 |
| 11,294,402 B1 * | 4/2022 | Baskin | F16L 25/0009 |
| 11,433,493 B2 * | 9/2022 | Kalyani | F04B 1/053 |
| 11,560,887 B2 * | 1/2023 | Hinderliter | E21B 43/2607 |

* cited by examiner

*Primary Examiner* — Michael Leslie
(74) *Attorney, Agent, or Firm* — HOGAN LOVELLS US LLP

(57) ABSTRACT

A fluid end for a fracturing pump includes a plurality of segments coupled together along a discharge axis, each segment of the plurality of segments having a plurality of suction bores. The fluid end also includes respective interfaces between segment pairs formed by adjacent segments of the plurality of segments, the interfaces coupling the segment pairs together. The fluid end further includes respective access areas proximate the respective interfaces, the respective access areas configured to provide access for mechanical couplings to join the segment pairs together.

20 Claims, 5 Drawing Sheets

SEGMENTED FLUID END PLUNGER PUMP

CROSS REFERENCE TO RELATED APPLICATIONS

This application is a continuation of U.S. patent application Ser. No. 17/136,943 filed Dec. 29, 2020 titled "SEGMENTED FLUID END PLUNGER PUMP," which is now U.S. Pat. No. 11,560,887 issued Jan. 24, 2023, which claims priority to and the benefit of U.S. Provisional Application Ser. No. 62/955,806 filed Dec. 31, 2019 titled "SEGMENTED FLUID END PLUNGER PUMP," the full disclosures of which are hereby incorporated herein by reference in their entirety for all intents and purposes.

BACKGROUND

1. Technical Field

This disclosure relates generally to hydraulic fracturing and more particularly to systems and methods for forming pumps for use in hydraulic fracturing operations.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

Space is at a premium at a fracturing site, where different vendors are often working simultaneously to prepare for a fracturing operation. As a result, utilizing systems that have large footprints may be undesirable. However, pressure pumpers still need to be able to provide sufficient pumping capacity in order to complete fracturing jobs.

SUMMARY

Applicant recognized the problems noted above herein and conceived and developed embodiments of systems and methods, according to the present disclosure, for calibration systems.

Systems and methods of the present disclosure are directed toward forming a multiplunger pump without using a single large block for the fluid end. Reciprocating plunger pumps are used for most hydraulic fracturing operations and are made up of three main components; Fluid End (FE), Power End (PE), and the Suction Manifold. The fluid end contains the valves that allow low pressure fluid to be drawn into a pressure cavity to be pressurized and discharged by a plunger stroke. This is the most common wear item other than smaller consumables such as seats, valves, plungers, and packing that need to be replaced frequently. A FE is normally made out of a large single block of metal which can restrict the ability to mobilize replacement equipment, replace fluid ends in the field, or manufacture replacements. The suction manifold allows for low pressure supply fluid to be drawn into each pressure cavity in the FE at a pressure and velocity to reduce cavitation during operation. The PE consists of the gear set, crankshaft, connecting rods, crosshead structure and plunger assemblies that convert rotational motion from a motor(s) or prime mover(s) into lateral plunger strokes at a specific speed in order to draw and discharge fluid from the pressure cavities in the FE. The embodiments described in this disclosure utilize the above-described PE structure, which is commonly used for quintuplex (five plunger) or triplex (three plunger) hydraulic fracturing pumps and expands the structure to nine or more plungers. Accordingly, the FE is expanded as well, but is segmented to alleviate the above-described problems of manufacturing, mobility and replacing FEs in the field.

In an embodiment, a fluid end for a fracturing pump includes a first segment, the first segment having a plurality of first suction bores and a first discharge path. The fluid end also includes a second segment, the second segment having a plurality of second suction bores and a second discharge path. The fluid end further includes a third segment, the third segment having a plurality of third suction bores and a third discharge path. The first segment is mechanically coupled to the second segment, the second segment is mechanically coupled to the third segment, and each of the first discharge path, the second discharge path, and the third discharge path are aligned.

In an embodiment, a fluid end for a fracturing pump includes a plurality of segments coupled together along a discharge axis, each segment of the plurality of segments having a plurality of suction bores. The fluid end also includes respective interfaces between segment pairs formed by adjacent segments of the plurality of segments, the interfaces coupling the segment pairs together. The fluid end further includes respective access areas proximate the respective interfaces, the respective access areas configured to provide access for mechanical couplings to join the segment pairs together.

BRIEF DESCRIPTION OF DRAWINGS

Some of the features and benefits of the present disclosure having been stated, others will become apparent as the description proceeds when taken in conjunction with the accompanying drawings, in which.

Figure 1:
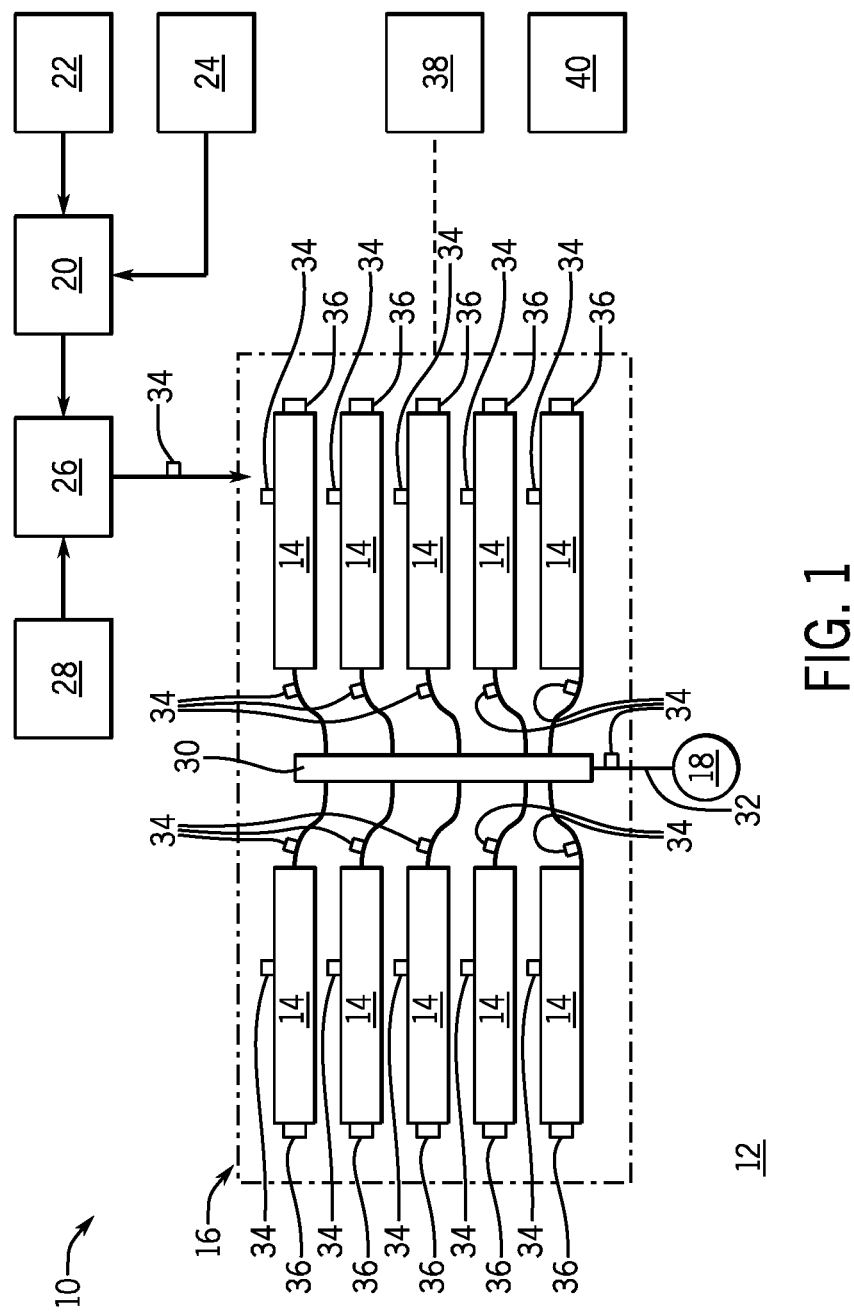
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure relate to combining smaller FE blocks into a single large FE. In hydraulic fracturing, fluid pumps are typically built as either triplex pumps with 3 plungers or quintuplex pumps with 5 plungers. Since the FEs are typically made from a single block of steel or alloy steel, most manufactures do not have the tooling to build larger pumps with more than 5 plungers, and most maintenance equipment used by service companies cannot lift FE blocks any larger or heavier than a quintuplex for replacement on a frac pump. While the present Applicant has identified the advantages of a larger pump for electric frac equipment, the supply chain of manufacturers willing and able to create such pumps is very small. However, these problems can be overcome by connecting 3 triplex FE blocks together with sealing systems between the discharge passages to generate a novemplex (nine plunger) pump. Using a series of triplex FEs enables any manufacturer to create the smaller components with minor modifications to their existing triplex designs. The same triplex block segments may also be usable as stand-alone triplex pumps for use in legacy equipment. This would increase vendor pools for purchasing FEs while also keeping inventory simple as triplex and novemplex pumps can share the same FEs.

Embodiments of the present disclosure may also reduce repair and maintenance costs. By way of example, a single triplex FE might cost around $30,000 while a novemplex might cost around $90,000. If a single bore in a single block novemplex FE washes out, the entire FE will need to be replaced. If a novemplex pump is composed of 3 triplex blocks bolted or otherwise coupled together, a single section can be replaced at a third of the cost. This will allow the useful remaining life of the other triplex sections to be utilized until failure. A single triplex section is also much lighter and can be lifted into place on a wellsite using a forklift, light crane, or small service truck crane. A large single block novemplex FE may require an overhead crane in a local shop or the use of a larger mobile crane which cannot always be parked close enough to equipment in the field for servicing. Replacement triplex sections can also be more easily transported between districts and out to well sites without needing large trailers and tractors. For example, if during hydraulic fracturing operations, the fluid supply to the suction ports of the FE might be hampered to the rear most plungers (7, 8, and 9) on a novemplex FE causing cavitation in those cavities of the FE, damage could be mitigated by swapping that triplex portion earlier than the other portions. For example, a section may be damaged by the cavitation, which could lead to an early failure of 1,000 hours or less while other sections may last 2,000 hours or more.

The most common hydraulic fracturing plunger type pump in the industry is a quintuplex pump with a 2,500 horsepower rating. Currently in the industry, there is a push by some pump manufacturers to create hydraulic fracturing pumps with power ends and fluid ends capable of operating at higher power levels, such as 5,000 horsepower. This effort is typically focused on electric fracturing units, since electric motors can be packaged in a much smaller footprint than diesel engine/transmission prime mover systems. These higher powered pump designs are centered around staying with a quintuplex style power ends and fluid ends with the overall footprint of the pumps remaining very similar to the 2,500 horsepower legacy pumps. While it is possible to redesign and strengthen the PE of a legacy style quintuplex pump to operate at 5,000 horsepower, the FE is still limited to 5 plungers. Essentially, at the 5,000 horsepower level, each plunger will now have double the amount of power pumping through them, thereby likely lessening the life of the FE by 50%. However, by utilizing features of the present disclosure, full utilization of a higher powered prime mover by both the PE and FE with no decrease in life expectancy is enabled.

Embodiments of the present disclosure provide pumps formed from segments of FEs rather than a large novemplex pump (9-plungers) made out of a single block of metal. For example, a novemplex pump may be formed from 3 triplex fluid ends connected together with a sealing system between the common discharge ports of the segments. This pump will act as a single FE block and can achieve far higher fluid rates and HHP. Additionally, using embodiments of the present disclosure enables scaling up to larger FEs, such as 12 or 15 plunger pumps. Further advantages are found by simplifying supply chains and warehousing by having common FEs that can be used in a variety of different applications.

FIG. 1 is a plan schematic view of an embodiment of a hydraulic fracturing system 10 positioned at a well site 12. In the illustrated embodiment, pumping units 14 (e.g., pump trucks), which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pumping units 14 may receive the slurry solution at a first pressure (e.g., 80 psi to 160 psi) and boost the pressure to around 15,000 psi for injection into the wellhead 18. In certain embodiments, the pumping units 14 are powered by electric motors.

After being discharged from the pump system 16, a distribution system 30, such as a missile, receives the slurry solution for injection into the wellhead 18. The distribution system 30 consolidates the slurry solution from each of the pump trucks 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like. In embodiments, the sensors 34, 36 transmit flow data to a data van 38 for collection and analysis, among other things. Furthermore, while not pictured in FIG. 1, there may be various valves distributed across the system. For examples, a manifold (not pictured) may be utilized to supply fluid to the pumping units 14 and/or to receive the pressurized fluid from the pumping units 14. Valves may be distributed to enable isolation of one or more components. As an example, there may be valves arranged to enable isolation of individual pumping units 14. Furthermore, various support units may also include valves to enable isolation. As noted above, it may be desirable to isolate singular pumping units 14 or the like if operation upsets are detected. This would enable operations to continue, although at a lower rate, and may potential environmental or personnel hazards, as well as prevent increased damage to the components. However, during operations, personnel may be evacuated or otherwise restricted from entering a pressure zone. Embodiments of the present disclosure may enable remote operation of the valves and, in various embodiments, may enable electrical control using electric energy provided on site, such as through a generator or the like.

A power generation system 40 is shown, which may include turbines, generators, switchgears, transformers, and the like. In various embodiments, the power generation system 40 provides energy for one or more operations at the well site. It should be appreciated that while various embodiments of the present disclosure may describe electric motors powering the pumping units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only to the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

In an embodiment, a small VFD paired with a dedicated electric motor rated for not more than 100 HP can be used to rotate the chemical additive pump, this motor and VFD can operate at voltages of 240V, 480V, 600V, 690V, or 720V. It should be appreciated that while embodiments may be described with reference to electric motors, in other embodiments, diesel prime movers and hydraulic pumps may also be utilized at the fracturing site, for example, to drive chemical additive pumps. For example, a large diesel engine can power an open or closed hydraulic system containing at least one hydraulic pump and one hydraulic motor to rotate a chemical additive pump. Both of these embodiments will be controlled by a software control system utilizing a user programmed P&ID loop and calibration factor used to help tune the accuracy of chemical flow rates and reactions to flow rate changes, as will be described below.

Figure 2:
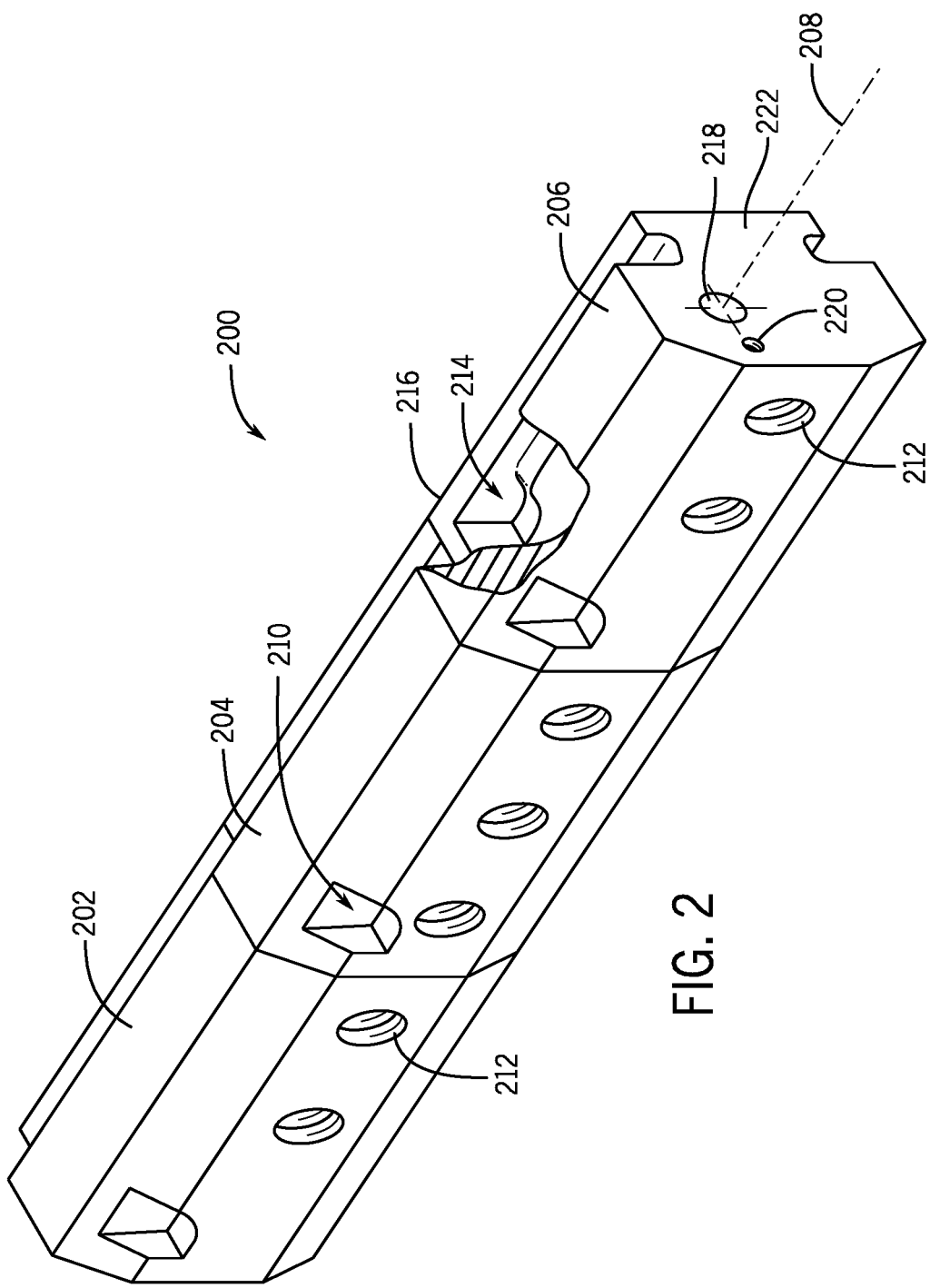
FIG. 2 is a perspective view of an embodiment of a fluid end, in accordance with embodiments of the present disclosure.

As described above, the pumps utilized in these operations may be pumps with three or five plungers. However, larger pumps may be desirable with larger PEs or where larger capacity may be desirable. Accordingly, embodiments of the present disclosure are directed toward systems and methods for modular or segmented FEs that may be used in fracturing operations, among other industrial applications. FIG. 2 is a perspective view of an embodiment of a novemplex FE 200 that includes a cutaway section to illustrate various features of the present disclose. It should be appreciated that various features have been removed for clarity with the present disclosure. The illustrated FE 200 consists of three different triplex FEs 202, 204, 206 that have been coupled together along a discharge axis 208 (e.g., perpendicular to the suction ends).

In the illustrated embodiment, a notch 210 has been machined into each triplex section 202, 204, 206 to allow for one or more fasteners (not pictured), such as bolts, studs, clamps, etc., to couple adjacent fluid end blocks together. It should be appreciated that a set of fasteners may be utilized for only two sections or may extend to couple more than two sections together. The illustrated notch 210 is arranged above (e.g., axially higher) suction caps 212, but it should be appreciated that the notch may be arranged below (e.g., axially lower) the suction caps 212 or there may be notches at both above and below locations.

Further illustrated within the cutout section is a second notch 214 in the rear 216 of the fluid end section, opposite the suction caps 212, where additional and/or alternative connectors may be used to couple the fluid end sections together. The rear section 216 of the FE faces the power end and is where the plungers penetrate each pressure bore.

A discharge port 218 is illustrated that runs the length of each fluid end section 202, 204, 206. Discharge piping is connected to one or both ends to allow pressurized fluid to be connected to a manifold or wellhead (not pictured). Sealing this connection between each fluid end section may be accomplished using sealing systems or the like. For example, various seals (e.g., elastomer, metallic, etc.) and the like may be utilized within various grooves formed between interfaces between the sections 202, 204, 26. It should be appreciated that the sealing design may be particularly selected depending on where along the assembly the fluid end section is arranged.

A coupling aperture 220 is illustrated at an end 222, which may receive the one or more fasteners to couple the fluid ends together. In the illustrated embodiment, the coupling aperture 220 is a threaded hole that receives a threaded bolt, but it should be appreciated that other apertures or receivers may be utilized to enable coupling of the various segments. As noted above, while a single aperture is illustrated in this embodiment, there may be multiple apertures that receive multiple fasteners to couple the sections together. Furthermore, as stated, a threaded fitting is only utilized as an example and various other features may also be used to couple the sections together. By way of example only, clamps may be utilized, or tongue and groove segments may be used to secure the sections together.

Suction caps are installed along the bores 212. As will be appreciated, there is one suction cap per pressure bore and plunger. It should be appreciated that certain bores/caps have been removed, but that embodiments of the present disclosure may be directed to a novemplex FE with 9 bores/suction caps. In other words, embodiments are directed toward coupling three triplex FEs together.

As noted above, various components have been removed from FIG. 2 for clarity. By way of example, discharge caps (normally on the top face of the fluid end sections) have been removed. These caps would be removed to allow operators access to the discharge valves and discharge port. Additionally, a suction manifold has been removed. In operation, the suction manifold is on the bottom of the fluid end and allows low pressure fluid to be supplied evenly to each pressure bore. This manifold can be placed on either the top or bottom of a fluid end and is opposite the discharge caps. Discharge irons have also been removed. Discharge irons are a pressure rated iron pipe that is normally bolted to one or both sides of the discharge port. The inside diameter and pressure rating of the iron are determined by the required flow rate and expected wellhead pressure. Sensor locations are also not noted in FIG. 2. Embodiments may include several sensors such as pressure transducers and vibration monitors. Additional components that have been removed include discharge port gaskets, bolt holes, other clamping bolts, and stay rods. Stay rods may hold the fluid end to the power end. They are similar to a sleeved bolt design where there is a gap between them to allow a "pony rod" from the power end to be attached to a plunger. The gap also allows maintenance of packing to prevent fluid leaks where the plungers enter the fluid end. Another example of a component that has been removed are packing lube ports for the plungers.

Figure 3:
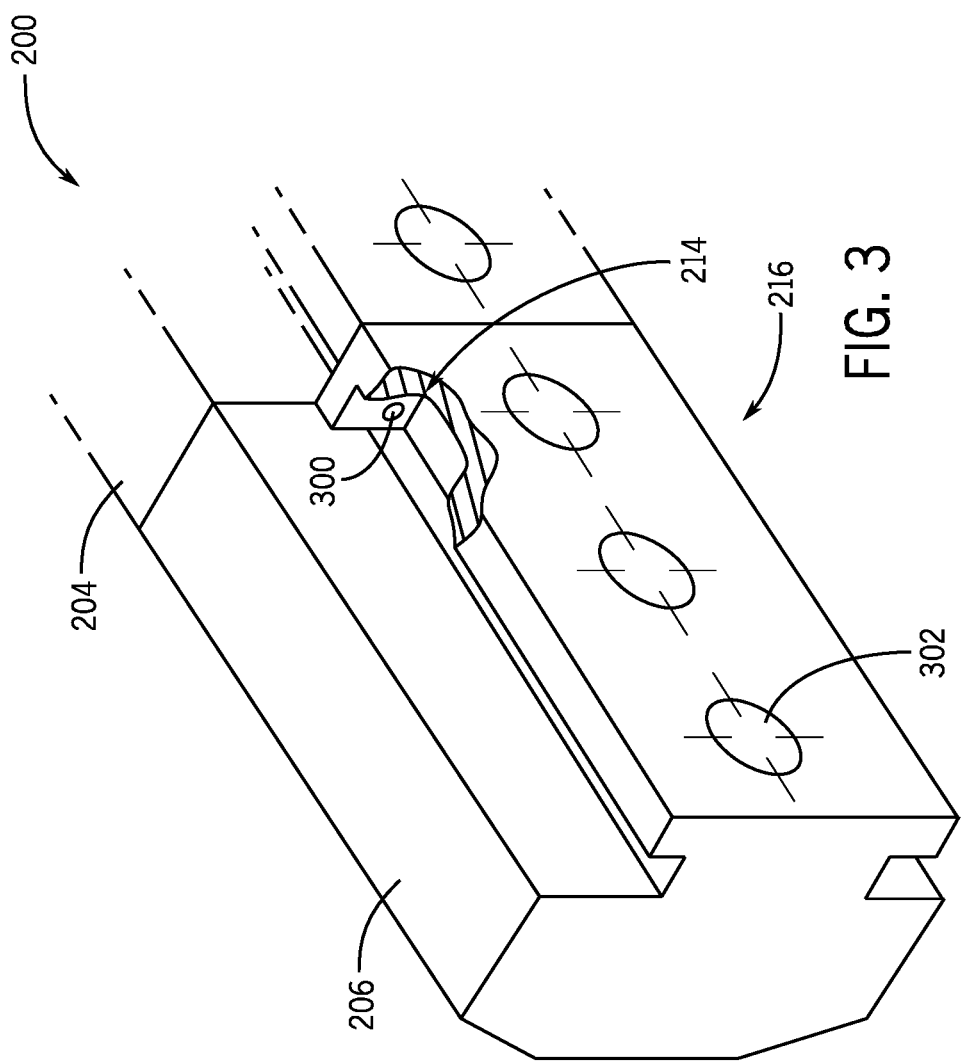
FIG. 3 is a perspective view of an embodiment of a fluid end, in accordance with embodiments of the present disclosure.

FIG. 3 illustrates a perspective view of the back side 216 of the FE 200. As described above, a cutaway section has been included to illustrate a section notch 214 that includes a fastener location 300 where a bolt, stud, or other fastener may be utilized to couple the fluid end sections 204, 206 together. As noted, there may also be sealing systems positioned between the fluid end sections. Furthermore, there may be more than one fastener used, along with alternative fastening arrangements. The illustrated embodiment also includes plunger penetration locations 302. As shown, triplex blocks are used, but it should be appreciated that other blocks, such as quintuplex blocks, may be used. The plunger penetration locations 302 illustrate the penetrations for the plungers in each fluid end section 204, 206. Accordingly, in various embodiments, the sections 202, 204, 206 are coupled together at both a suction side and a power side, but it should be appreciated that more or fewer areas may be coupled together based on anticipated operating conditions and the like.

Figure 4:
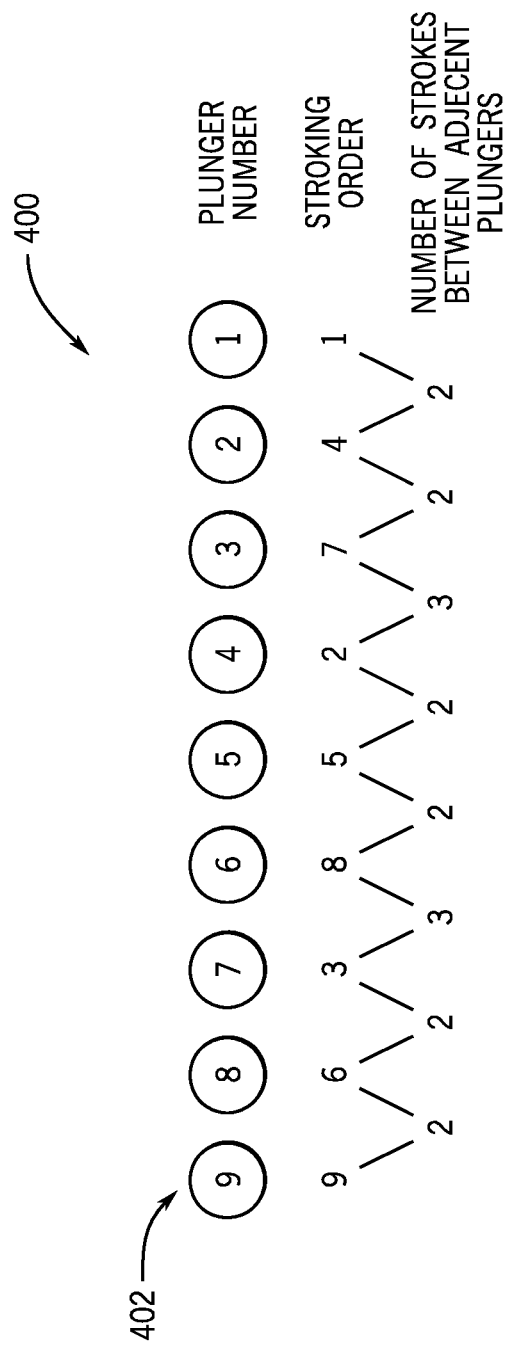
FIG. 4 is a schematic view of an embodiment of a stroking order, in accordance with embodiments of the present disclosure.

FIG. 4 is a schematic illustration of a stroking order 400 that may be utilized with embodiments of the present disclosure. For example, the illustrated embodiment describes a novemplex pump having nine plungers 402. The preferred stroking order, or the order in which plungers within the fluid end make their respective discharge stroke, is an order which will result in the optimum balancing of the loading on the crankshaft. Referring to FIG. 4, the circles represent the number of plunger bores within the FE, and for simplicity are numbered 1 through 9 from right to left, wherein the plungers 402 would reciprocate within the bores. The preferred stroking order would be as shown in the middle row.

This order results in the following number of plungers that have gone through their respective discharge strokes adjacent to the plunger that is stroking next according the shown stroking order. So, after plunger #1 strokes, plungers #4 and #7 go through their respective strokes before plunger #2 which is adjacent to plunger #1. Therefore, there were two plunger strokes relatively far away from plunger #1 (#4 and #7) that completed their respective strokes before the adjacent plunger to #1 stroked. Accordingly, after plunger #2 strokes, plunger #5 and #8 complete their stroke resulting in 2 strokes occurring relatively far away from plunger #2. As shown in the figure, the number of strokes that occur between plunger #3 and #4 is 3. The number of strokes that occur between plunger #4 and #5 is 2, and so on as the figure shows. Therefore, the loading on the crankshaft from this stroking order is balanced. It should be appreciated that the illustrated stroking order is for illustrative purposes only and that other embodiments may have different stroking orders. Furthermore, different arrangements may be established based on the number of plungers used.

Figure 5:
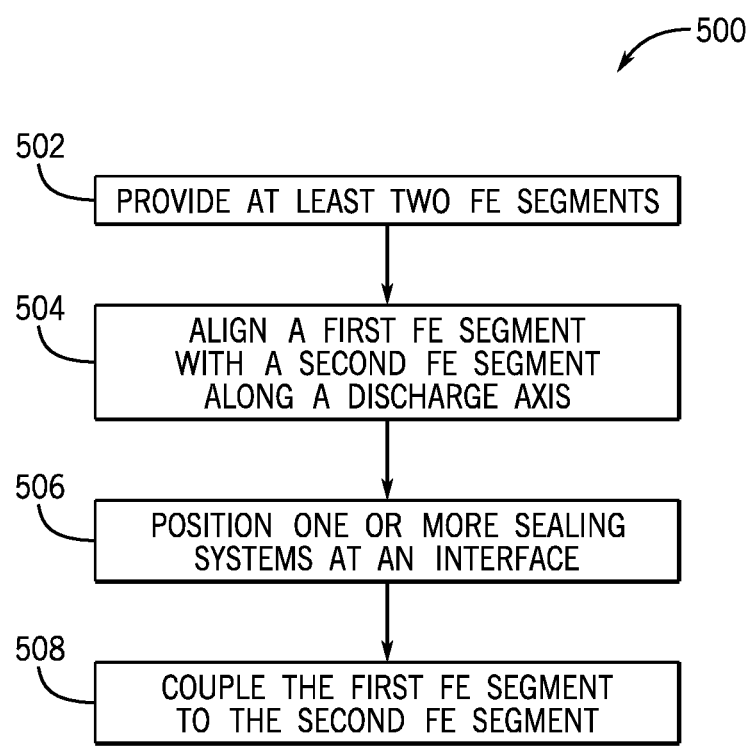
FIG. 5 is a flow chart of an embodiment of a method for forming a segmented fluid end, in accordance with embodiments of the present disclosure.

FIG. 5 is a flow chart of an embodiment of a method 500 for assembling a segmented FE. It should be appreciated that this method, and all methods described herein, may have more or fewer steps. Moreover, the steps may be performed in a different order, or in parallel, unless otherwise specifically stated. In this example, at least two FE segments are provided 502. As noted above, the FE segments may be configured to be coupled together, and as a result, at two FE segments may be aligned along a discharge axis 504. The alignment may correspond to aligning respective apertures formed in the segments. One or more sealing systems may be positioned at an interface between the segments 506. The sealing systems may include various seals and/or machined components that are utilized to block fluid leakage. The segments may then be coupled together 508. In this manner, a segmented FE may be formed by joining together a selected number of FE segments.

Embodiments of the present disclosure present a number of advantages over existing systems and methods. As an example, systems and methods of the present disclosure may reduce costs by using multiple smaller blocks for pump manufacturing. As a result, production of a single larger block may be cheaper and easier. Furthermore, repairs and/or replacements may be performed on specific sections, rather than on the entire block. Moreover, inventory control with manufacturers and operations may be improved. For example, legacy equipment can continue to use triplex and quintuplex blocks while newer equipment can use novemplex (9) or quindenplex (15) pumps composed of the same blocks. In various embodiments, operators may keep supplies of the sections that may be then swapped out to replace either the legacy triplex blocks or to make repairs to the newly formed blocks. Moreover, a vendor pool may be increased as more companies may be capable of manufacturing smaller blocks.

Embodiments may provider further advantages in the field. For example, the systems described herein may enable easier field swaps because a single block section (triplex or quintuplex) may be easier to transport and swap out on a frac pump trailer in the field versus a single large novemplex block. Moreover, utilizing these systems may result in fewer pump trailers on location. For example, a triplex pump can pump at an optimal fluid rate of around 5 bpm (barrels per minute) whereas a single novemplex can discharge up to 12 bpm for an optimal rate. It should be appreciated that these rates are for illustrative purposes only and may be rounded off and depend of plunger size, discharge pressure, and plunger velocity. A normal frac site needs 90-120 bpm with an additional 12-18 bpm as spare or standby pumping capability. Accordingly, the number of trailers may be reduced through the incorporation of larger pumps. Moreover, fewer trailers may also lead to fewer power cables, thereby decreasing congestion at the site. Additionally, with fewer trailers and power cables required to have the same amount of HHP (hydraulic horsepower) on a frac fleet, operations may be able to reduce the amount of switch gear on electric frac sites. Switch gear is composed of the breakers, relays, and bus bars that safely distribute electricity to connected equipment. As an example, replacing 15 quintuplex pumps with 10 novemplex pumps would reduce switch gear by one third. This reduction in switch gear leads to reduced costs and shrinks the size of the switch gear trailers.

Systems and methods of the present disclosure may also incorporate larger power ends to maintain compact and mechanically simple designs. As an example, a single large PE may be utilized with embodiments of the present disclosure. However, it should be appreciated that PEs may also be similarly segmented, as noted about with respect to the FEs. By way of example, a PE normally lasts 3-5 times longer than a standard FE and field swaps are normally not performed. Once assembled, a frac pump may only need a PE swap every 6,000-8,000 hours versus an expected life span of 1,500-2,000 hours for a FE. As a result, larger PEs will still enable longer overall useful lives when utilized with embodiments of the present disclosure. Additionally, embodiments may also incorporate larger motors or prime movers. That is, embodiments may include a physically larger and higher HP motor or prime mover to take advantage of the large fluid pumps. While this may take up space and add weight and/or cost to each frac pump trailer, due to quantities of scale and the advantages obtained by using a larger pump, the cost per horsepower of an entire fleet will be reduced. Moreover, such a configuration simplifies equipment rig up by reducing the number of individual trailers and power cables on a wellsite. Horsepower ranges of 3500-5500 BHP may be desirable to take advantage of the larger fluid pumps, as compared to present ratings of 1750-2500 HHP for triplex and quintuplex designs.

Various embodiments may also incorporate stronger couplers to withstand the torque of the large motors. Additionally, leak points between segments (e.g., at segment interfaces) may be addressed using a variety of methods. The discharge bore through the fluid ends is typically machined horizontally through all of the plunger vertical cross bores such that the horizontal discharge bore terminates with a machined flange connection on each side onto which the discharge manifold connects. One methodology of sealing between FE segments includes machining the sealing geometry into the side of each FE instead of machining the flange connection geometry such that the sealing interface on one side of the fluid end could be termed the "male" sealing interface and the opposite side of the fluid end could be termed the "female" sealing interface. Clamping this interface together could be performed as shown above. A number of sealing methods are possible, but one embodiment of the sealing elements could be to utilize a common D-ring seal in the horizontal sealing pocket of the "female" sealing interface in addition to a common o-ring seal machined into the vertical face of the "female" sealing interface. The "male" sealing interface on each FE would then be particularly sized to obtain the desired amount of compression on the seals when the clamping bolts or studs are tightened to connect the FE segments together. The same methodology would apply to connecting the third FE segment into the first pair. Adapters could then be machined to connect to the two exposed sealing interfaces on the unconnected sides of group of 3 fluid ends. These adapters may be designed to connect to the common legacy discharge manifold components. Embodiments of the present disclosure may also be utilized with larger trailers. A larger fluid end, power end, motor, variable frequency drive (VFD), and cooling package may use a larger trailer than traditional systems. For electric equipment, trailer sizes have been reduced significantly as the technology advanced and became more compact. Applicant has recognized capability to lengthening the trailers by 10 or more feet to increase the HHP.

It should be appreciated that various configurations shown herein are for illustrative purposes to convey concepts discussed herein, but are not intended to be limiting. For example, the segmented FE pump that was used as an example throughout this disclosure is the "Triple-Triplex"-Novemplex, which is a frac pump composed to three triplex blocks sealed together to prevent fluid leaks to act as a large novemplex pump powered by a single power end. However, there are several other usable combinations that could be created while using current styles of fluid end blocks, including but not limited to a "Quintuple-Triplex" Quindenplex fluid end. This configuration is composed of 5 triplex blocks to create a large 15-plunger pump. Additionally, a "Triple-Quintuplex" Quindenplex fluid end is another possible 15-plunger pump composed of 3 quintuplex blocks. As another example, a "Double-Quintuplex" Decemplex fluid end is a 10-plunger pump composed of 2 quintuplex blocks. It should be appreciated that even numbers of plungers may be undesirable due to their flow ripple (approximately double odd number plunger pumps). However, embodiments of the present disclosure enable a resulting flow ripple better than that of the industry accepted triplex and comparable to that of the industry accepted quintuplex due to the number of plungers. In another example, a "Quadruple-Triplex" Duodecaplex fluid end is a 12-plunger pump formed by using 4 triplex blocks. This is another even numbered plunger pump, but the flow ripple would be acceptable due to the quantity of plungers. It should be appreciated various other configurations may also be enabled by embodiments of the present disclosure.

Various embodiments of the present disclosure may include a plunger and valve size of 4" for the novemplex pump. Many current triplex and quintuplex pumps are 4.5". Some pump down pumps (frac pumps modified for higher fluid rate and a lower pressure rating) use 5" components. All three of these sizes are industry standards and can be used for the Segmented FE Pump design of the present disclosure. Other nonstandard component sizes of 3.5", 3.75", and 4.25" may also be used. The advantages of some of these smaller and intermediate sizes include providing a better balance of fluid rate and maximum pressure rating. It should be appreciated that various components may be selected, at least in part, by rod load on the PE and horsepower capability of the prime mover. For example, a novemplex PE and FE may be rated for 4500 HHP with a 5000 BHP motor attached; this could allow the pump to achieve fluid rates of 12 BPM at a max pressure of 15,000 psi. Alternatively, the same FE/PE/Motor combination with a larger plunger and valve size could achieve fluid rates of 15 BPM at a max pressure of 12,000 psi. Certain shale basins have higher or lower expected frac pressures and frac pumps can be tailored to meet this requirement with the highest possible fluid rate per pump. This same frac pump could be converted to a pump-down pump with an even larger component size and achieve 18 BPM with a pressure rating of 10,000 psi, this would allow use of a single frac pump trailer for pump down whereas normally 2-4 pump trailers are required. Fluid end blocks can be made out of stainless steel or carbon steel, among other materials.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

We claim:

1. A fluid end for a fracturing pump, comprising:
    a first segment, the first segment having a plurality of first suction bores and a first discharge path;
    a second segment, the second segment having a plurality of second suction bores and a second discharge path; and
    a third segment, the third segment having a plurality of third suction bores and a third discharge path;
    wherein the first segment is mechanically coupled to the second segment, the second segment is mechanically coupled to the third segment, and each of the first discharge path, the second discharge path, and the third discharge path are parallel with respective axes of mechanical fasteners positioned between the first segment, the second segment, and the third segment.

2. The fluid end of claim 1, wherein the second segment comprises:
    a notch having a second aperture aligned with a first aperture of the first segment.

3. The fluid end of claim 2, wherein the notch is at least one of axially higher than the plurality of suction bores or axially lower than the plurality of suction bores.

4. The fluid end of claim 2, wherein the notch is formed on at least one of a suction side of the second segment or a back side of the second segment.

5. The fluid end of claim 1, wherein a number of first suction bores is different from at least one of a number of second suction bores or a number of third suction bores.

6. The fluid end of claim 1, wherein each of the plurality of first suction bores, the plurality of second suction bores, and the plurality of third suction bores has an equal number of respective suction bores.

7. The fluid end of claim 1, further comprising:
    a sealing system arranged at an interface between the first segment and the second segment, the sealing system including at least one seal.

8. The fluid end of claim 1, wherein the plurality of first suction bores, the plurality of second suction bores, and the plurality of third suction bores have a cumulative number of bores equal to at least one of nine bores, ten bores, twelve bores, or fifteen bores.

9. The fluid end of claim 1, wherein a first end of the first segment is machined as a female end and a second end of the first segment is machined as a male end.

10. A fluid end for a fracturing pump, comprising:
    a plurality of segments coupled together along a discharge axis, each segment of the plurality of segments having a plurality of suction bores;
    respective interfaces between segment pairs formed by adjacent segments of the plurality of segments, the interfaces having orifices; and
    respective access areas proximate the respective interfaces, the respective access areas configured to provide access for mechanical couplings to join the segment pairs together via the respective orifices such that axes of the mechanical couplings are parallel to the discharge axis and parallel to one another.

11. The fluid end of claim 10, wherein the mechanical couplings are threaded fasteners.

12. The fluid end of claim 10, wherein a single access area is associated with a respective interface.

13. The fluid end of claim 10, wherein a first access area is arranged axially higher than the plurality of suction bores and a second access area is arranged axially lower than the plurality of suction bores, wherein each of the first access area and the second access area are associated with a common segment pair.

14. The fluid end of claim 10, wherein a first access area of the respective access areas is on a front side associated with the plurality of suction bores and a second access area of the respective access areas is on a back side associated with openings to receive plungers.

15. The fluid end of claim 10, wherein the plurality of suction bores is equal for each segment of the plurality of segments and include three suction bores, four suction bores, or five suction bores.

16. The fluid end of claim 10, further comprising:
respective sealing systems arranged at the respective interfaces, the respective sealing systems including at least one seal.

17. A system, comprising:
a fluid end having a first segment, a second segment, and a third segment, wherein each of the first segment, the second segment, and the third segment has a plurality a suction bores, and a first discharge path of the first segment is aligned with a second discharge path of the second segment and a third discharge path of the third segment, and wherein the first segment is coupled to the second segment and the second segment is coupled to the third segment via mechanical fasteners; and
a plurality of plungers, wherein a respective plunger of the plurality of plungers is associated with a suction bore of the plurality of suction bores, the fluid end being configured with a stroking order such that a number of strokes between adjacent plungers for each respective plunger associated with the plurality of suction bores is greater than one.

18. The system of claim 17, wherein the stroking order is further configured such that at least two plungers are positioned between a first stroking plunger and a second stroking plunger, wherein the first stroking plunger is before the second stroking plunger in the stroking order.

19. The system of claim 17, wherein the stroking order is further configured such that a first stroking plunger corresponds to the first segment, a second stroking plunger correspond to the second segment, and a third stroking plunger correspond to the third segment.

20. The system of claim 17, wherein a total number of the plurality of suction bores is equal to at least one of nine bores, ten bores, twelve bores, or fifteen bores.

* * * * *